United States Patent
Hosono et al.

(10) Patent No.: US 12,552,452 B2
(45) Date of Patent: Feb. 17, 2026

(54) STEERING CONTROL DEVICE

(71) Applicants: JTEKT CORPORATION, Kariya (JP); TOYOTA JIDOSHA KABUSHIKI KAISHA, Toyota (JP)

(72) Inventors: Hiroshi Hosono, Toyota (JP); Terutaka Tamaizumi, Okazaki (JP); Yuki Inden, Okazaki (JP); Naru Takata, Okazaki (JP); Saki Takahashi, Seto (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 51 days.

(21) Appl. No.: 18/744,904

(22) Filed: Jun. 17, 2024

(65) Prior Publication Data
US 2024/0425108 A1 Dec. 26, 2024

(30) Foreign Application Priority Data

Jun. 21, 2023 (JP) .................................. 2023-101975

(51) Int. Cl.
*B62D 6/00* (2006.01)
*B62D 5/04* (2006.01)

(52) U.S. Cl.
CPC ............ *B62D 6/008* (2013.01); *B62D 5/0469* (2013.01)

(58) Field of Classification Search
CPC .......... B62D 6/008; B62D 6/00; B62D 5/006; B62D 5/007; B62D 5/0469; B62D 5/0472; B62D 5/0463
See application file for complete search history.

(56) References Cited

U.S. PATENT DOCUMENTS

| | | | |
|---|---|---|---|
| 2006/0037806 A1 | 2/2006 | Kasahara et al. | |
| 2006/0042860 A1* | 3/2006 | Endo | B62D 6/008 180/412 |
| 2010/0004825 A1* | 1/2010 | Nakano | B62D 6/008 701/42 |
| 2013/0138300 A1* | 5/2013 | Hayama | B62D 5/046 701/43 |
| 2019/0367075 A1* | 12/2019 | Kodera | B62D 5/003 |

(Continued)

FOREIGN PATENT DOCUMENTS

JP 2020-142704 A 9/2020

OTHER PUBLICATIONS

Jan. 17, 2025 Extended Search Report issued in European Patent Application No. 24182856.5.

*Primary Examiner* — George C Jin
(74) *Attorney, Agent, or Firm* — Oliff PLC

(57) ABSTRACT

A steering control device controls a steering system including a reaction force motor that gives a steering reaction force to a steering shaft and a turning motor that turns a turning wheel in a state where dynamic power transmission from the steering shaft is blocked. The steering control device includes a processor that executes a reaction force setting process and a reaction force giving process. In the reaction force setting process, the processor sets the steering reaction force using a predetermined-component reflecting process. In the reaction force giving process, the processor operates the reaction force motor such that the reaction force motor gives the steering reaction force set by the reaction force setting process.

9 Claims, 9 Drawing Sheets

(56) References Cited

U.S. PATENT DOCUMENTS

2020/0130737 A1* 4/2020 Kodera ................ B62D 6/008
2020/0180680 A1* 6/2020 Han .................... B62D 5/0463
2020/0283062 A1  9/2020 Kudo
2020/0324808 A1* 10/2020 Kodera ............... B62D 5/0463
2021/0229739 A1  7/2021 Kodera
2022/0227416 A1* 7/2022 Suzuki ................ B62D 15/025
2022/0315097 A1  10/2022 Yoshida et al.

* cited by examiner

STEERING CONTROL DEVICE

CROSS-REFERENCE TO RELATED APPLICATION

This application claims priority to Japanese Patent Application No. 2023-101975 filed on Jun. 21, 2023, incorporated herein by reference in its entirety.

BACKGROUND

1. Technical Field

The present disclosure relates to a steering control device.

2. Description of Related Art

For example, Japanese Unexamined Patent Application Publication No. 2020-142704 (JP 2020-142704 A) describes a so-called steer-by-wire system (referred to as an SBW, hereinafter) in which dynamic power transmission between a steering wheel and a turning wheel is blocked. In the SBW, a road surface reaction force, which is a force that the turning wheel receives from a road surface, is not transmitted to the steering wheel. Therefore, it is difficult for a driver to have a moderate steering feeling that corresponds to the road surface reaction force.

Hence, a control device described in JP 2020-142704 A sets the reaction force that is given to the steering wheel, depending on a predetermined frequency component of an electric current in a motor that turns the turning wheel. The electric current that flows through the motor reflects the road surface reaction force. Accordingly, with the above control device, it is possible to transmit the road surface reaction force to the steering wheel.

However, in the case where the reaction force that is given to the steering wheel is set depending on the predetermined frequency component as described above in a situation where the system including the SBW is unstable, there is a risk that the control cannot be appropriately performed. Moreover, in the case where the control cannot be appropriately performed, there is a risk that the vibration of the steering wheel becomes greater than a vibration caused by the above road surface reaction force.

SUMMARY

In an aspect of the present disclosure, a steering control device is configured to control a steering system including a reaction force motor and a turning motor, the reaction force motor giving a steering reaction force to a steering shaft, the turning motor turning a turning wheel in a state where dynamic power transmission from the steering shaft is blocked. The steering control device includes a processor configured to execute a reaction force setting process, a reaction force giving process, and an interlocking process. In the reaction force setting process, the processor sets the steering reaction force using a predetermined-component reflecting process. In the reaction force giving process, the processor operates the reaction force motor such that the reaction force motor gives the steering reaction force set by the reaction force setting process. In the predetermined-component reflecting process, the processor reflects, in the steering reaction force, a predetermined component of a frequency signal that is given to the turning wheel. In the interlocking process, the processor alters one of a first pair of variables consisting of a reflection specifying variable and a variable that determines a change in the steering reaction force with respect to an operation of the steering shaft, depending on another of the first pair. The reflection specifying variable specifies the way to extract the predetermined component.

The above predetermined component is a frequency component that has information about a road surface. Accordingly, in the above configuration, since the steering reaction force is set using the predetermined-component reflecting process, it is possible to transmit the road surface information to a driver.

Meanwhile, in the case where the change in the steering reaction force with respect to the operation of the steering shaft is large, the gain of the steering reaction force with respect to the operation of the steering shaft is larger than in the case where the change in the steering reaction force with respect to the operation of the steering shaft is small, and therefore, the steering system more easily becomes unstable. In the case where the component having the road surface information is large in the situation where the steering system easily becomes unstable, there is a risk that the steering system actually becomes unstable. Hence, in the above configuration, one of the reflection specifying variable and the variable that determines the change in the steering reaction force with respect to the operation of the steering shaft is altered depending on the other of the reflection specifying variable and the variable that determines the change in the steering reaction force with respect to the operation of the steering shaft. Thereby, it is possible to restrain the degree of the reflection of the predetermined component in the steering reaction force from becoming so large as to cause the unstableness of the steering system.

The processor may be configured to execute a shaft force gradient calculating process. In the shaft force gradient calculating process, the processor may calculate a shaft force gradient. The shaft force gradient may be the rate of a change in a force against a rotation of the steering shaft with respect to a change in a rotation angle of the steering shaft. In the interlocking process, the processor may further alter one of a second pair of variables consisting of the reflection specifying variable and the shaft force gradient, depending on another of the second pair.

In the case where the shaft force gradient is large, the gain of the steering reaction force with respect to the change in the steering angle is larger than in the case where the shaft force gradient is small, and therefore, the steering system more easily becomes unstable. In the case where the component having the road surface information is large in the situation where the steering system easily becomes unstable, there is a risk that the steering system actually becomes unstable. Hence, in the above configuration, one of the reflection specifying variable and the shaft force gradient is altered depending on the other of the reflection specifying variable and the shaft force gradient. Thereby, it is possible to restrain the degree of the reflection of the predetermined component in the steering reaction force from becoming so large as to cause the unstableness of the steering system.

The reaction force setting process may include an assist amount setting process and a shaft force setting process. In the shaft force setting process, the processor may set a shaft force against a rotation operation of the steering shaft by a driver. In the assist amount setting process, the processor may set an assist amount by which the driver is assisted to rotate the steering shaft. The steering reaction force may be determined depending on a value resulting from subtracting the assist amount from the shaft force.

In a steering system in which the dynamic power transmission between the steering shaft and the turning shaft is performed, the shaft force from the turning wheel becomes a force that hinders the rotation operation of the steering shaft by the driver. Therefore, the assist amount is an amount by which the steering by the driver is assisted. On the other hand, in the above configuration, it is possible to virtually realize the shaft force against the rotation operation of the steering shaft, by control, in the state where the dynamic power transmission between the steering shaft and the turning shaft is blocked. Therefore, it is possible to set the assist amount with the same concept as the concept for the steering system in which the dynamic power transmission between the steering shaft and the turning wheel is performed.

In the shaft force gradient calculating process, the processor may calculate a change amount of the shaft force set by the shaft force setting process with respect to the change in the rotation angle of the steering shaft.

In the above configuration, it is possible to calculate the actual shaft force gradient of the steering shaft with high accuracy, by calculating the change amount of the shaft force set by the shaft force setting process with respect to the change in the rotation angle of the steering shaft.

In the interlocking process, the processor may alter the reflection specifying variable, using the shaft force gradient as an input. In the configuration, it is possible to reflect the predetermined component, in a range in which the steering system can be restrained from becoming unstable at the current shaft force gradient.

The predetermined-component reflecting process may include a predetermined-component extracting process and an extraction altering process. In the predetermined-component extracting process, the processor may extract the predetermined component depending on the reflection specifying variable. In the extraction altering process, the processor may alter the reflection specifying variable. In the shaft force setting process, the processor may set the shaft force depending on a shaft force specifying variable that specifies a relation of the shaft force with respect to the change in the rotation angle of the steering shaft. In the interlocking process, the processor may alter the shaft force specifying variable, using the reflection specifying variable as an input.

In the above configuration, it is possible to set the shaft force gradient, in a range in which the steering system can be restrained from becoming unstable at the current degree of the reflection of the predetermined component.

The reaction force setting process may include a basic assist amount setting process and a shaft force setting process. In the shaft force setting process, the processor may set a shaft force against a rotation operation of the steering shaft by a driver. In the basic assist amount setting process, the processor may set a basic assist amount by which the driver is assisted to rotate the steering shaft, using a steering torque as an input. The steering reaction force may be determined depending on a value resulting from subtracting the basic assist amount from the shaft force. In the interlocking process, the processor may further alter one of a second pair of variables consisting of the reflection specifying variable and an assist gradient, depending on another of the second pair. The assist gradient may be the rate of a change amount of the basic assist amount with respect to a change amount of the steering torque.

In the steering system in which the dynamic power transmission between the steering shaft and the turning shaft is performed, the shaft force from the turning wheel becomes a force that hinders the rotation operation of the steering shaft by the driver. Therefore, the assist amount is an amount by which the steering by the driver is assisted. On the other hand, in the above configuration, it is possible to virtually realize the shaft force against the rotation operation of the steering shaft, by control, in the state where the dynamic power transmission between the steering shaft and the turning shaft is blocked. Therefore, it is possible to set the assist amount with the same concept as the concept for the steering system in which the dynamic power transmission between the steering shaft and the turning wheel is performed.

In the case where the assist gradient is large, the steering system more easily become unstable than in the case where the assist gradient is small. In the case where the component having the road surface information is large in the situation where the steering system easily becomes unstable, there is a risk that the steering system actually becomes unstable. Hence, in the above configuration, one of the reflection specifying variable and the assist gradient is altered depending on the other of the reflection specifying variable and the assist gradient. Thereby, it is possible to restrain the degree of the reflection of the predetermined component in the steering reaction force from becoming so large as to cause the unstableness of the steering system.

In the interlocking process, the processor may alter the reflection specifying variable, using the assist gradient as an input. In the configuration, it is possible to reflect the predetermined component, in a range in which the steering system can be restrained from becoming unstable at the current assist gradient.

The predetermined-component reflecting process may include predetermined-component extracting process and an extraction altering process. In the predetermined-component extracting process, the processor may extract the predetermined component depending on the reflection specifying variable. In the extraction altering process, the processor may alter the reflection specifying variable. In the interlocking process, the processor may alter the assist gradient, using the reflection specifying variable as an input.

In the above configuration, it is possible to set the assist gradient, in a range in which the steering system can be restrained from becoming unstable at the current degree of the reflection of the predetermined component.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

A first embodiment will be described below with reference to the drawings.

Premise Configuration

Figure 1:
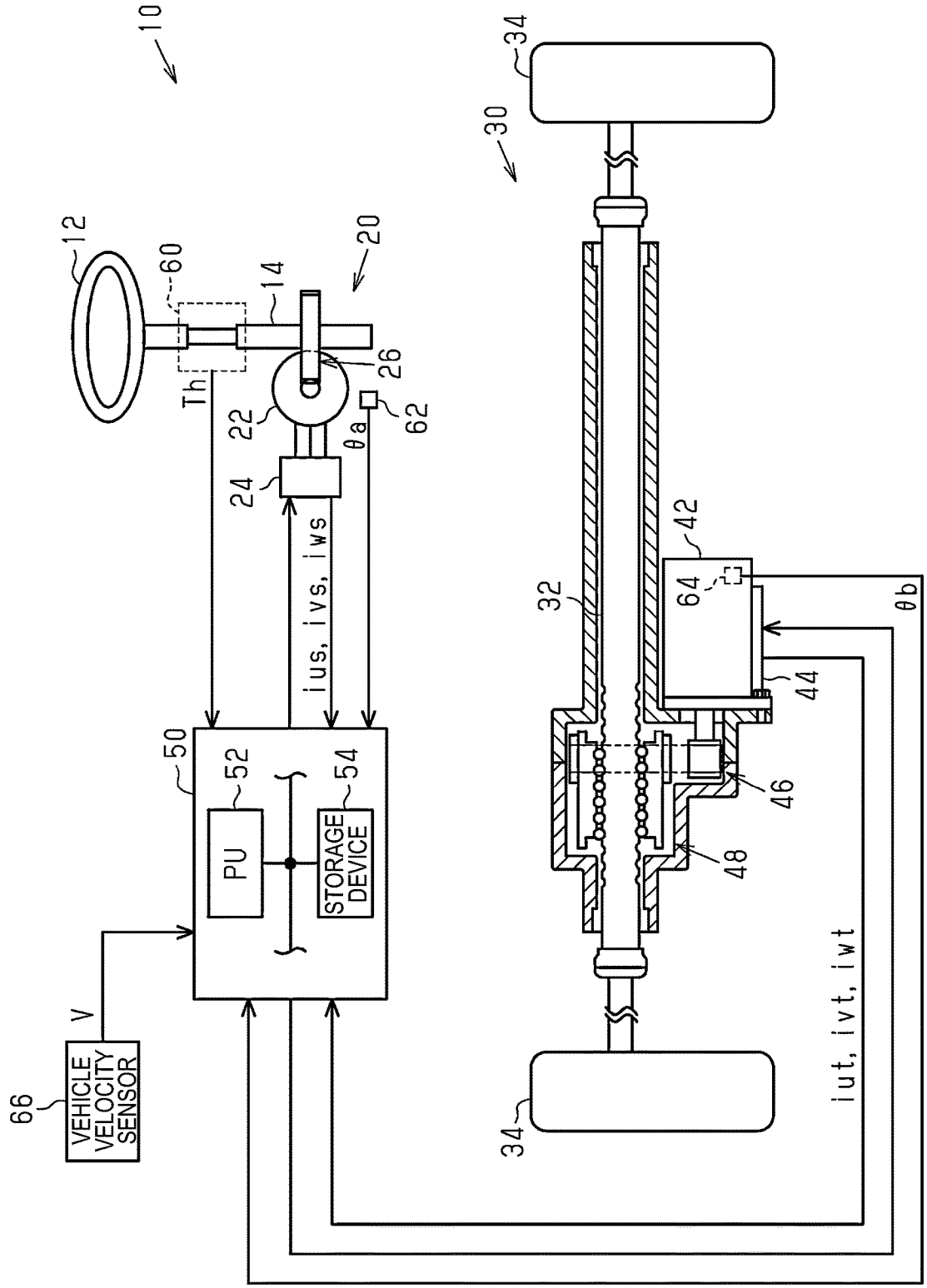
FIG. 1 is a diagram showing the configuration of a steering system according to a first embodiment.

A steering device 10 of a vehicle shown in FIG. 1 is a steer-by-wire type device. The steering device 10 includes a steering wheel 12, a steering shaft 14, a reaction force actuator 20, and a turning actuator 30. The steering shaft 14 is coupled to the steering wheel 12. The reaction force actuator 20 is an actuator that gives a force against the force of the operation of the steering wheel 12 by a driver. The reaction force actuator 20 includes a reaction force motor 22, a reaction force inverter 24, and a reaction force speed reduction mechanism 26. The reaction force motor 22 gives a steering reaction force that is a force against steering, to the steering wheel 12 through the steering shaft 14. The reaction force motor 22 is coupled to the steering shaft 14 through the reaction force speed reduction mechanism 26. As the reaction force motor 22, for example, a three-phase synchronous electric motor is employed. For example, the reaction force speed reduction mechanism 26 is constituted by a worm and wheel.

The turning actuator 30 is an actuator that is used in order to turn turning wheels 34 in response to driver's steering intention indicated through the operation of the steering wheel 12 by the driver. The turning actuator 30 includes a rack shaft 32, a turning motor 42, a turning inverter 44, a turning transmission mechanism 46, and a conversion mechanism 48. As the turning motor 42, for example, a three-phase surface-magnet synchronous electric motor (SPM) is employed. The turning transmission mechanism 46 is constituted by a belt transmission mechanism. By the turning transmission mechanism 46, the rotational power of the turning motor 42 is transmitted to the conversion mechanism 48. The conversion mechanism 48 converts the transmitted rotational power into displacing power in the axial direction of the rack shaft 32. By the displacement of the rack shaft 32 in the axial direction of the rack shaft 32, the turning wheels 34 are turned.

The steering control device 50 controls the steering wheel 12 and the turning wheels 34. That is, the steering control device 50 controls the steering reaction force against the steering by the driver, as a controlled variable for the steering wheel 12 as a control object. Further, the steering control device 50 controls a turning angle, as a controlled variable for the turning wheels 34 as a control object. The turning angle is the moving angle of a tire that is the turning wheel 34.

For the control of controlled variables, the steering control device 50 refers to a steering torque Th that is detected by a torque sensor 60. The steering torque Th is a torque that is given to the steering shaft 14 through the operation of the steering wheel 12 by the driver. For the control of controlled variables, the steering control device 50 refers to a rotation angle θa that is detected by a steering-side rotation angle sensor 62 and that is the angle of a rotation shaft of the reaction force motor 22. Further, for the control of controlled variables, the steering control device 50 refers to electric currents ius, ivs, iws that flow through the reaction force motor 22. For example, the electric currents ius, ivs, iws may be detected as voltage drop amounts of shunt resistors that are provided for the respective legs of the reaction force inverter 24. For the control of controlled variables, the steering control device 50 refers to a rotation angle θb that is detected by a turning-side rotation angle sensor 64 and that is the angle of a rotation shaft of the turning motor 42. Further, for the control of controlled variables, the steering control device 50 refers to electric currents iut, ivt, iwt that flow through the turning motor 42. For example, the electric currents iut, ivt, iwt may be detected as voltage drop amounts of shunt resistors that are provided for the respective legs of the turning inverter 44. The steering control device 50 refers to a vehicle velocity V that is detected by a vehicle velocity sensor 66.

The steering control device 50 includes a PU 52 and a storage device 54. The PU 52 is a software processor such as a CPU, a GPU, and a TPU. The storage device 54 may be a non-volatile memory in which electric rewriting is impossible. Further, the storage device 54 may be a non-volatile memory in which electric rewriting is possible, and may be a storage medium such as a disk medium.

Outline of Control

Figure 2:
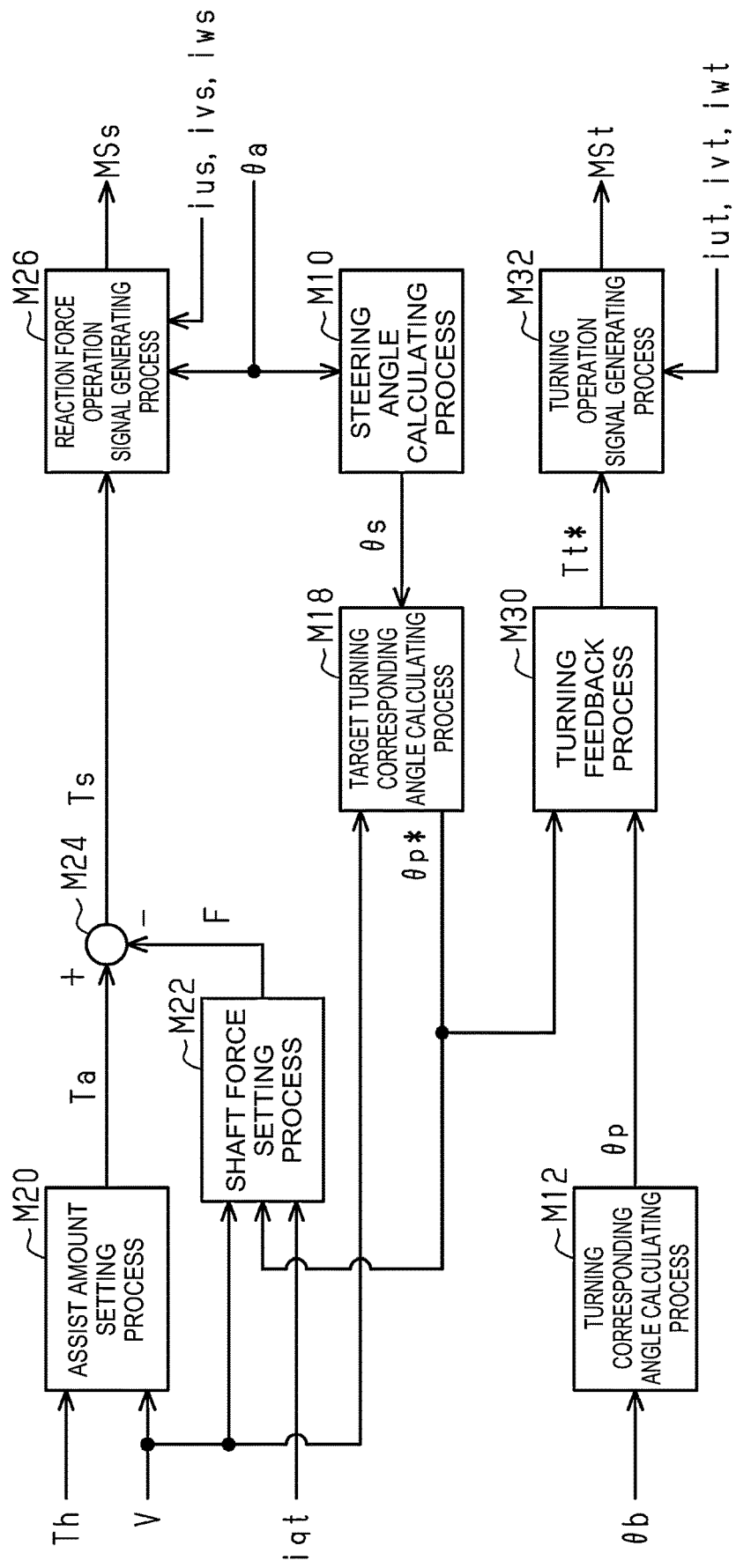
FIG. 2 is a block diagram showing a process that is executed by a control device according to the first embodiment.

FIG. 2 shows a process that is executed by the steering control device 50. The process shown in FIG. 2 is realized when the PU 52 repeatedly executes the program stored in the storage device 54, with a predetermined period, for example.

A steering angle calculating process M10 includes a process of converting the rotation angle θa into an integrated angle including a range exceeding 360 degrees, for example, by counting the rotation number of the reaction force motor 22 from a steering neutral position that is the position of the steering wheel 12 when the vehicle moves straight. The steering angle calculating process M10 includes a process of calculating a steering angle θs, by multiplying the integrated angle obtained by the conversion by a conversion factor based on the rotation speed ratio of the reaction force speed reduction mechanism 26.

A turning corresponding angle calculating process M12 includes a process of converting the rotation angle θb into an integrated angle including a range exceeding 360 degrees, for example, by counting the rotation number of the turning motor 42 from a rack neutral position that is the position of the rack shaft 32 when the vehicle moves straight. The turning corresponding angle calculating process M12 includes a process of calculating a turning corresponding angle θp corresponding to the turning angle of the turning wheels 34, by multiplying the integrated angle obtained by the conversion by a conversion factor depending on the reduction ratio of the turning transmission mechanism 46, a lead of the conversion mechanism 48, and the like. The turning corresponding angle θp is an amount that has a proportional relation with the turning angle. As an example, the turning corresponding angle θp is positive in the case of an angle on the right side of the rack neutral position, and is negative in the case of an angle on the left side of the rack neutral position.

A target turning corresponding angle calculating process M18 is a process of calculating a target turning corresponding angle θp* depending on the steering angle θs and the vehicle velocity V.

An assist amount setting process M20 is a process of calculating an assist amount Ta, using the steering torque Th and the vehicle velocity V as inputs. The assist amount Ta is an amount in the same direction as the direction of the steering by the driver. The magnitude of the assist amount Ta is set to a large value in the case where the force for assisting the steering by the driver is large.

A shaft force setting process M22 is a process of setting a shaft force F, using the vehicle velocity V, a q-axis electric current iqt of the turning motor 42 and the target turning corresponding angle θp* as inputs. The shaft force F is a value that expresses, by control, the force that acts on the rack shaft 32 through the turning wheels 34. However, for the shaft force F, it is not necessary to intend to estimate the force that acts on the rack shaft 32, with high accuracy. As the shaft force F, for example, the force that acts on the rack shaft 32 may be virtually determined. The shaft force F is a shaft force resulting from the conversion into the torque that is given to the steering shaft 14. That is, the shaft force F is a shaft force resulting from the conversion into the torque that is given to the steering shaft 14 when the state where the dynamic power transmission between the turning wheels 34 and the steering shaft 14 is possible is assumed. The shaft force F is an amount that acts in the opposite direction of the direction of the steering by the driver. The shaft force setting process M22 may be a process of calculating the shaft force F such that the absolute value of the shaft force F is larger as the absolute value of the target turning corresponding angle θp* is larger. Further, for example, the shaft force setting process M22 may be a process of calculating the shaft force F such that the absolute value of the shaft force F is larger as the vehicle velocity V is higher. Further, the shaft force setting process M22 may be a process of calculating the shaft force F such that the absolute value of the shaft force F is larger as the absolute value of the q-axis electric current iqt is larger. The q-axis electric current iqt is calculated by the PU 52, depending on the turning corresponding angle θp and the electric currents iut, ivt, iwt.

A subtraction process M24 is a process of substituting a value resulting from subtracting the shaft force F from the assist amount Ta, into a target reaction force torque Ts. The target reaction force torque Ts is a target value of the torque that is given to the steering shaft 14 by the reaction force motor 22.

A reaction force operation signal generating process M26 is a process of generating an operation signal MSs for the reaction force inverter 24, for controlling the torque of the reaction force motor 22 such that the torque that is given to the steering shaft 14 becomes the target reaction force torque Ts. More specifically, the reaction force operation signal generating process M26 includes a process of converting the target reaction force torque Ts into a target torque of the reaction force motor 22. Further, the reaction force operation signal generating process M26 includes a process of calculating the operation signal MSs for the reaction force inverter 24, such that the electric current that flows through the reaction force motor 22 gets close to an electric current determined from the target reaction force torque Ts by the feedback control of the electric current. Actually, the operation signal MSs includes respective operation signals for six switching elements of the reaction force inverter 24. Since the torque of the reaction force motor 22 becomes the target reaction force torque Ts, the steering reaction force against the force for the rotation of the steering wheel 12 is "(−1)·Ts".

A turning feedback process M30 is a process of substituting a manipulated variable in a feedback control in which the turning corresponding angle θp is used as a controlled variable and the target turning corresponding angle θp* is used as a target value of the controlled variable, into the target turning torque Tt*. The target turning torque Tt* satisfies a constant rate with respect to the torque of the turning motor 42.

A turning operation signal generating process M32 is a process of generating an operation signal MSt for the turning inverter 44, for controlling the torque of the turning motor 42 such that the torque of the turning motor 42 becomes a value that satisfies a constant rate with respect to the target turning torque Tt*. More specifically, the turning operation signal generating process M32 includes a process of converting the target turning torque Tt* into a target torque of the turning motor 42. Further, the turning operation signal generating process M32 includes a process of calculating the operation signal MSt for the turning inverter 44, such that the electric current that flows through the turning motor 42 gets close to an electric current determined from the target torque, by the feedback control of the electric current. Actually, the operation signal MSt includes respective operation signals for six switching elements of the turning inverter 44.

Shaft Force Setting Process

Figure 3:
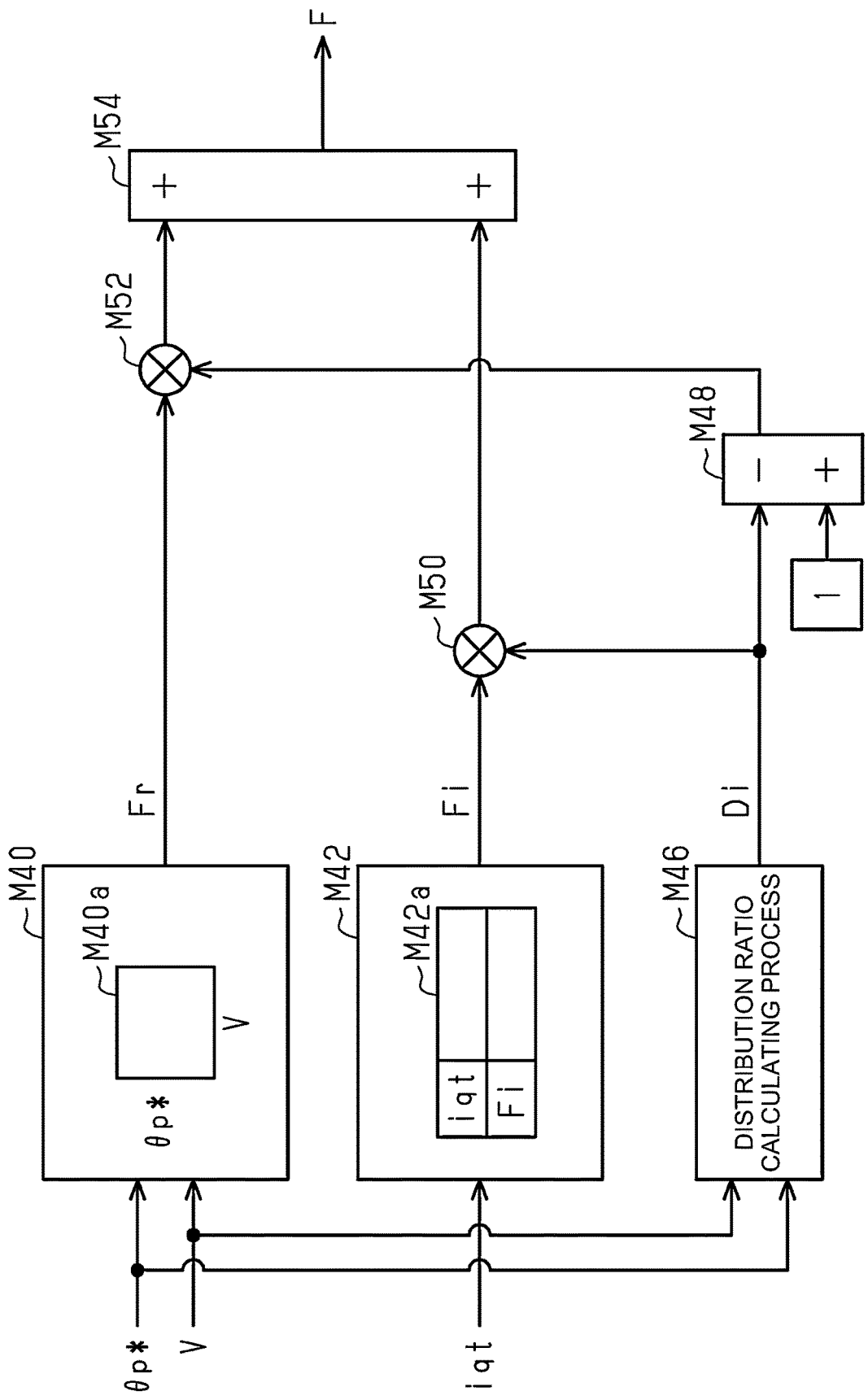
FIG. 3 is a block diagram showing a process that is executed by the control device according to the first embodiment.

FIG. 3 shows details of the shaft force setting process M22.

An angle shaft force setting process M40 is a process of calculating an angle shaft force Fr, using the target turning corresponding angle θp* and the vehicle velocity V as inputs. The angle shaft force Fr is an estimated value of the shaft force that is specified by an arbitrarily set vehicle model or the like. The angle shaft force Fr is calculated as a shaft force in which road surface information is not reflected. The road surface information is information about minute roughnesses that do not influence the lateral behavior of the vehicle, steps that influence the lateral behavior of the vehicle, and the like. For example, the angle shaft force setting process M40 may be a process that is performed such that the absolute value of the angle shaft force Fr is larger as the absolute value of the target turning corresponding angle θp* is larger. Further, for example, the angle shaft force setting process M40 may be a process that is performed such that the absolute value of the angle shaft force Fr is larger as the vehicle velocity V is higher.

More specifically, the angle shaft force setting process M40 is a process of performing map computation for the angle shaft force Fr, using an angle shaft force map M40a. The angle shaft force map M40a is a map in which the target turning corresponding angle θp* and the vehicle velocity V are used as inputs and the angle shaft force Fr is used as an output variable.

The map data is combination data of discrete values of an input variable and values of an output variable that respectively correspond to the values of the input variable. Further, the map computation may be a process of adopting a corresponding value of the output variable in the map data, as the computation result, in the case where the value of the input variable coincides with one of the values of the input variable in the map data. Further, the map computation may be a process of adopting a value obtained by the interpolation among a plurality of values of the output variable included in the map data, as the computation result, in the case where the value of the input variable does not coincide with any of the values of the input variable in the map data. Instead, the map computation may be a process of adopting a value of the output variable in the map data that corresponds to a value closest to the value of the input variable among a plurality of values of the input variable included in the map data, as the computation result, in the case where the value of the input variable does not coincide with any of the values of the input variable in the map data.

The electric current shaft force setting process M42 is a process of calculating an electric current shaft force Fi as the q-axis electric current iqt of the turning motor 42. The electric current shaft force Fi is an estimated value of the shaft force that actually acts on the rack shaft 32 that operates for turning the turning wheels 34, that is, an estimated value of the shaft force that is actually transmitted to the rack shaft 32. The electric current shaft force Fi is calculated as the shaft force that reflects the above road surface information. For example, the electric current shaft force setting process M42 is a process of calculating the electric current shaft force Fi such that the torque that is given to the rack shaft 32 by the turning motor 42 balances with the torque corresponding to the force that is given to the rack shaft 32 through the turning wheels 34. That is, the electric current shaft force setting process M42 is a process of calculating the electric current shaft force Fi such that the absolute value of the electric current shaft force Fi is larger as the absolute value of the q-axis electric current iqt is larger.

More specifically, the electric current shaft force setting process M42 is a process of performing map computation for the electric current shaft force Fi, using an electric current shaft force map M42a. The electric current shaft force map M42a is a map in which the q-axis electric current iqt is used as an input variable and the electric current shaft force Fi is used as an output variable.

A distribution ratio calculating process M46 is a process of calculating a ratio Di, using the vehicle velocity V and the target turning corresponding angle θp* as inputs. The ratio Di is the ratio of the electric current shaft force Fi to the sum of the angle shaft force Fr and the electric current shaft force Fi. The ratio Di has a value that is zero or more and is 1 or less. For example, the distribution ratio calculating process M46 may be a process in which the PU 52 performs map computation for the ratio Di in a state where map data is stored in the storage device 54. The map data is data in which the vehicle velocity V and the target turning corresponding angle θp* are used as input variables and the ratio Di is used as an output variable.

A second distribution ratio calculating process M48 is a process of calculating a second ratio "1-Di" by subtracting the ratio Di from "1". The second ratio is the ratio of the angle shaft force Fr to the sum of the angle shaft force Fr and the electric current shaft force Fi.

A first ratio multiplying process M50 is a process of multiplying the electric current shaft force Fi by the ratio Di. A second ratio multiplying process M52 is a process of multiplying the angle shaft force Fr by the second ratio. An addition process M54 is a process of substituting a value resulting from adding an output value of the first ratio multiplying process M50 and an output value of the second ratio multiplying process M52, into the shaft force F. That is, the shaft force F has a value resulting from the weighted average processing of the angle shaft force Fr and the electric current shaft force Fi.

Assist Amount Setting Process

Figure 4:
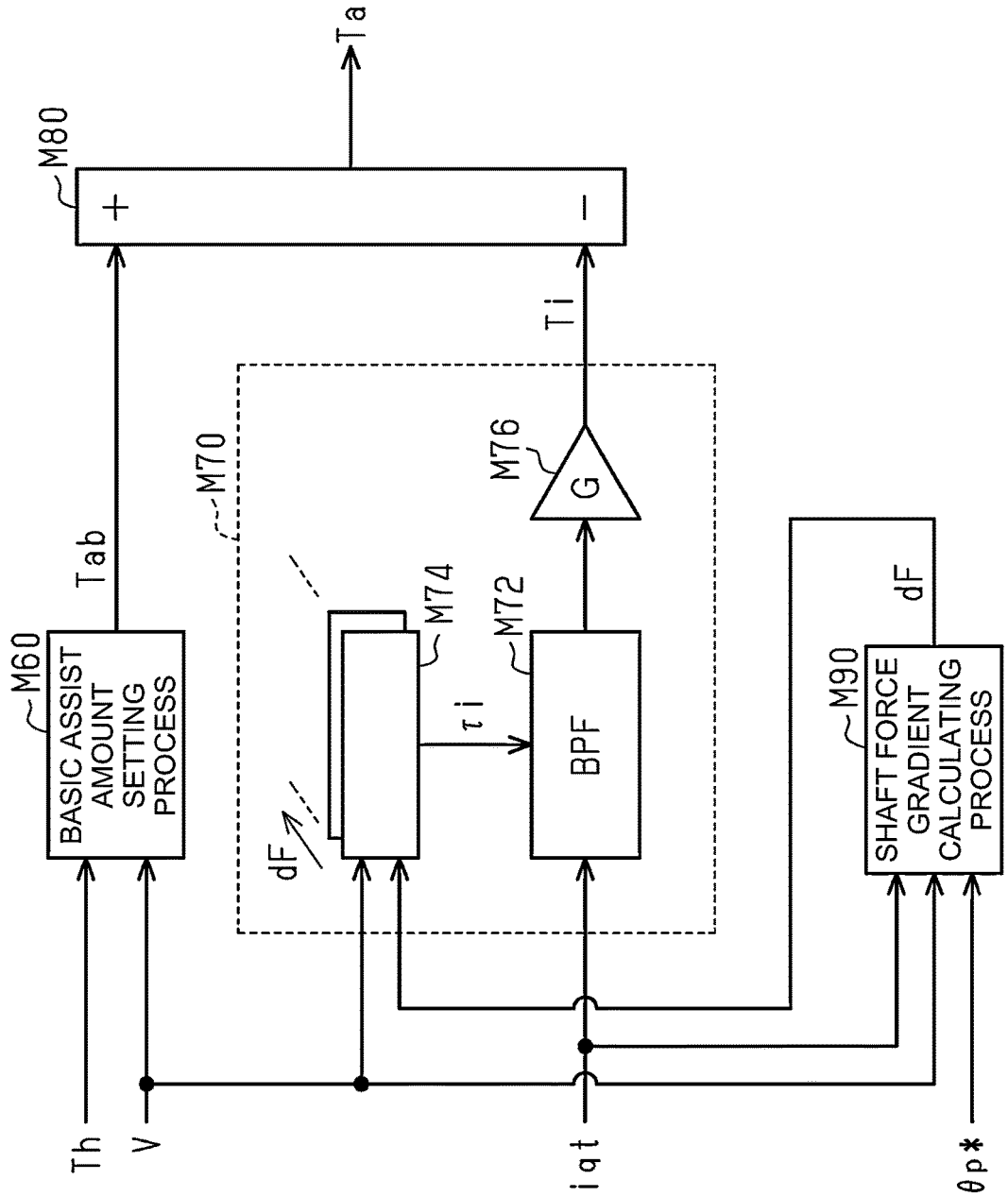
FIG. 4 is a block diagram showing a process that is executed by the control device according to the first embodiment.

FIG. 4 shows details of the assist amount setting process M20.

A basic assist amount setting process M60 is a process of setting a basic assist amount Tab, using the steering torque Th and the vehicle velocity V as inputs. In the basic assist amount setting process M60, the basic assist amount Tab is set to a value that is positively correlated with the steering torque Th. For example, this process may be a process in which the PU 52 performs map computation for the basic assist amount Tab in a state where map data is previously stored in the storage device 54. The map data is data in which the steering torque Th and the vehicle velocity V are used as input variables and the basic assist amount Tab is used as an output variable.

A road information process M70 is a process for superposing information relevant to the road surface reaction force, which is the force that is given from the road surface to the turning wheels 34, on the steering wheel 12. The road information process M70 includes a bandpass filter M72, a filter factor setting process M74, and a gain multiplying process M76. The q-axis electric current iqt is input to the bandpass filter M72. The q-axis electric current iqt is input to the bandpass filter M72, as a variable that includes a vibrational component of the turning wheels 34 due to the road surface reaction force. The bandpass filter M72 is a process of selectively extracting a signal in a vibrational frequency band due to the roughness of the road surface. The gain multiplying process M76 is a process of substituting a value resulting from multiplying an output value of the bandpass filter M72 by a gain G, into a road surface information torque Ti. The filter factor setting process M74 is a process of setting a filter factor ti of the bandpass filter M72 depending on the vehicle velocity V. The filter factor ti is a variable for specifying a frequency band that is transmitted by the bandpass filter M72, or a variable for specifying the manner of attenuation. For example, the variable for specifying the frequency band that is transmitted may be a variable that specifies a center frequency. Further, for example, the variable for specifying the manner of attenuation may be an attenuation factor. Here, the filter factor ti is described as one variable, but actually, may include a plurality of variables.

A synthesis process M80 is a process of subtracting the road surface information torque Ti from the basic assist amount Tab. The value calculated in this way is the assist amount Ta.

A shaft force gradient calculating process M90 is a process of calculating a shaft force gradient dF, using the vehicle velocity V, the target turning corresponding angle θp* and the q-axis electric current iqt as inputs. The shaft force gradient dF is a variable indicating the rate of the change in the shaft force F with respect to the change in the steering angle θs. As shown in FIG. 3, the angle shaft force Fr is calculated using the target turning corresponding angle θp* and the vehicle velocity V as inputs. The target turning corresponding angle θp* is a variable that is correlated with the steering angle θs. Accordingly, the rate of the change in the angle shaft force Fr with respect to the change in the steering angle θs can be calculated depending on the target turning corresponding angle θp* and the vehicle velocity V.

Meanwhile, in the process exemplified in FIG. 3, the electric current shaft force Fi is set independently from the variable that indicates the angle. However, there is a relation in the change in the electric current shaft force Fi with respect to the change in the steering angle θs, because, for example, the q-axis electric current iqt is realized by the feedback control in which the turning corresponding angle θp is used as a controlled variable. Therefore, it is possible to know the rate of the change in the electric current shaft force Fi with respect to the change in the steering angle θs, using the target turning corresponding angle θp* and the q-axis electric current iqt as inputs.

Specifically, the shaft force gradient calculating process M90 may be a process of performing map computation for the shaft force gradient dF, using the vehicle velocity V, the target turning corresponding angle θp* and the q-axis electric current iqt as inputs. The map uses the vehicle velocity V, the target turning corresponding angle θp* and the q-axis electric current iqt as input variables, and uses the shaft force gradient dF as an output variable.

Operation and Effect of Embodiment

The PU 52 sets the target reaction force torque Ts by subtracting the shaft force F from the assist amount Ta. Then, the torque of the reaction force motor 22 is controlled depending on the target reaction force torque Ts. The shaft force F is a value that can be adjusted by control design. Therefore, the steering reaction force that is given to the driver can be freely designed by control design. However, the stability of the steering system more easily decreases as the change in the shaft force F with respect to the change in the steering angle θs is larger. Therefore, in the case where amplitudes in a predetermined frequency band increase due to the road surface information torque Ti when the stability of the steering system easily decreases, there is a risk that the steering system actually becomes unstable.

Hence, the PU 52 sets the filter factor τi depending on the shaft force gradient dF. Thereby, it is possible to restrain an excessive increase in amplitudes in a frequency band that causes the unstableness. Accordingly, it is possible to restrain the steering system from becoming unstable due to the road surface information torque Ti.

Second Embodiment

A second embodiment will be described below with a focus on differences from the first embodiment, with reference to the drawings.

Figure 5:
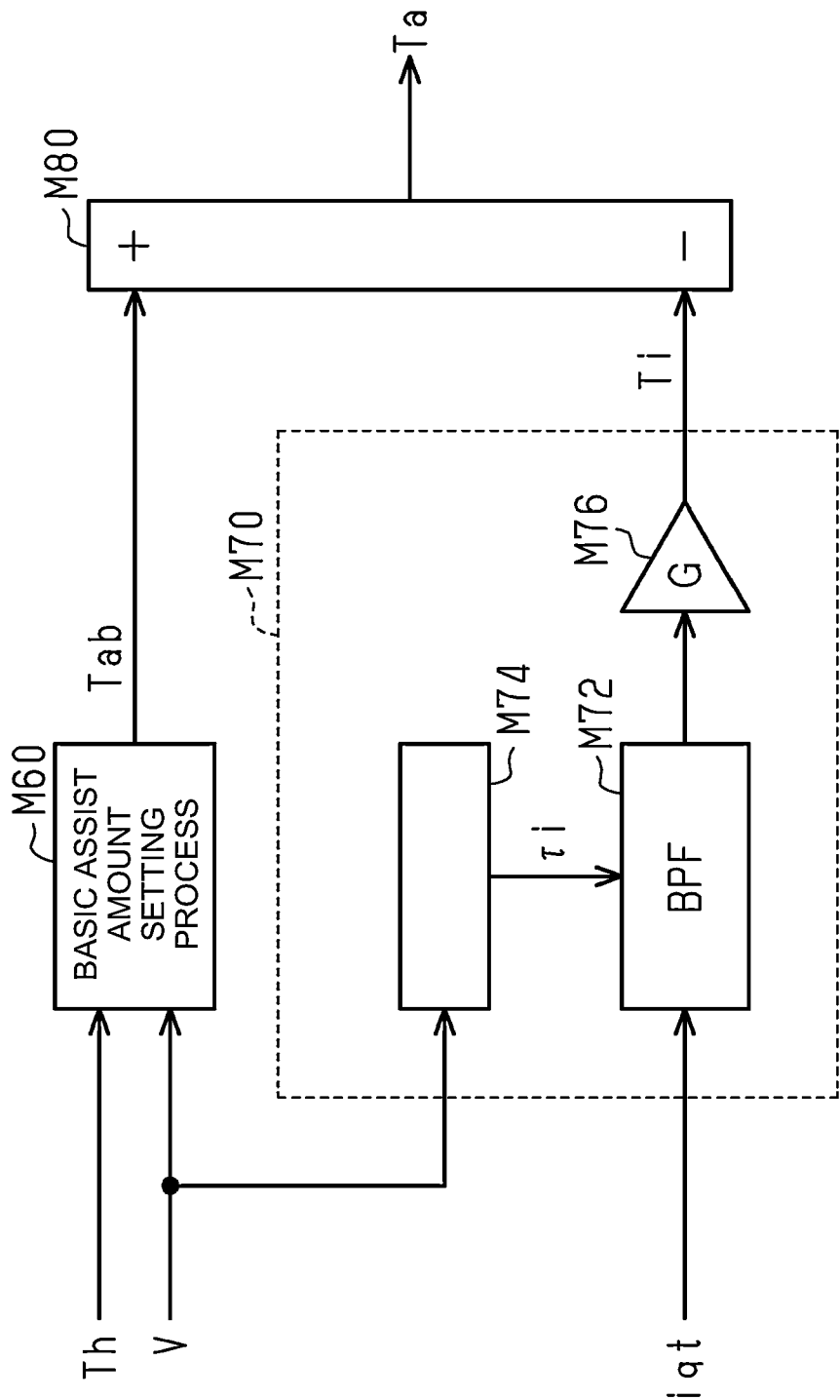
FIG. 5 is a block diagram showing a process that is executed by a control device according to a second embodiment.

FIG. 5 shows details of the assist amount setting process M20. In FIG. 5, for the sake of convenience, processes corresponding to processes shown in FIG. 4 are denoted by identical step numbers.

In the embodiment, as shown in FIG. 5, the shaft force gradient dF is not used as an input in the filter factor setting process M74 of the road information process M70.

Figure 6:
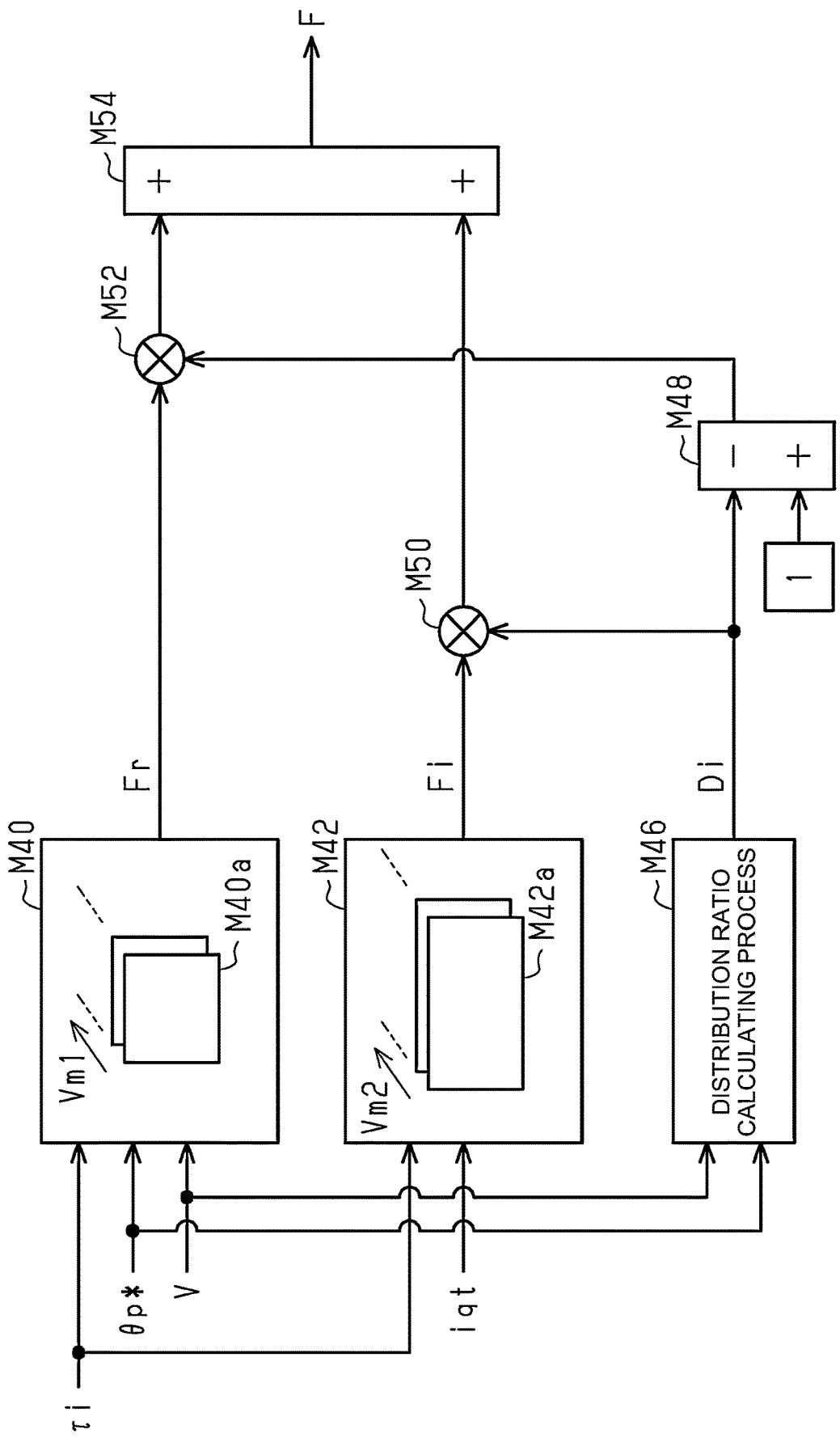
FIG. 6 is a block diagram showing a process that is executed by the control device according to the second embodiment.

FIG. 6 shows details of the shaft force setting process M22. In FIG. 6, for the sake of convenience, processes corresponding to processes shown in FIG. 3 are denoted by identical step numbers.

As shown in FIG. 6, in the angle shaft force setting process M40, the filter factor τi of the road information process M70 is used as an input. More specifically, the angle shaft force setting process M40 includes a process of calculating the value of a map identifying variable Vm1 from the filter factor τi. Meanwhile, in the embodiment, there is a plurality of kinds of angle shaft force maps M40a in which the target turning corresponding angle θp* and the vehicle velocity V are used as input variables and the angle shaft force Fr is used as an output variable. Moreover, the angle shaft force setting process M40 includes a process of determining which of the plurality of kinds of angle shaft force maps M40a is used in the map computation for the angle shaft force Fr, based on the map identifying variable Vm1.

Further, in the electric current shaft force setting process M42, the filter factor τi of the road information process M70 is used as an input. More specifically, the electric current shaft force setting process M42 includes a process of calculating the value of a map identifying variable Vm2 from the filter factor τi. Meanwhile, in the embodiment, there is a plurality of kinds of electric current shaft force maps M42a in which the q-axis electric current iqt is used as an input variable and the electric current shaft force Fi is used as an output variable. Moreover, the electric current shaft force setting process M42 includes a process of determining which of the plurality of kinds of electric current shaft force maps M42a is used in the map computation for the electric current shaft force Fi, based on the map identifying variable Vm2.

Operation and Effect of Embodiment

The PU 52 alters the map for setting the shaft force F, depending on the filter factor τi of the road information process M70. Thereby, the rate of the change in the shaft force F set by the shaft force setting process M22 with respect to the change in the steering angle θs is altered depending on the filter factor τi. Thereby, it is possible to restrain the generation of such a shaft force gradient that the steering system becomes unstable due to the road surface information torque Ti.

Third Embodiment

A third embodiment will be described below with a focus on differences from the first embodiment, with reference to the drawings.

In the embodiment, as an input of the road information process M70, an assist gradient R is used instead of the shaft force gradient dF. The assist gradient R is the rate of the change amount of the basic assist amount Tab with respect to the change amount of the steering torque Th.

Figure 7:
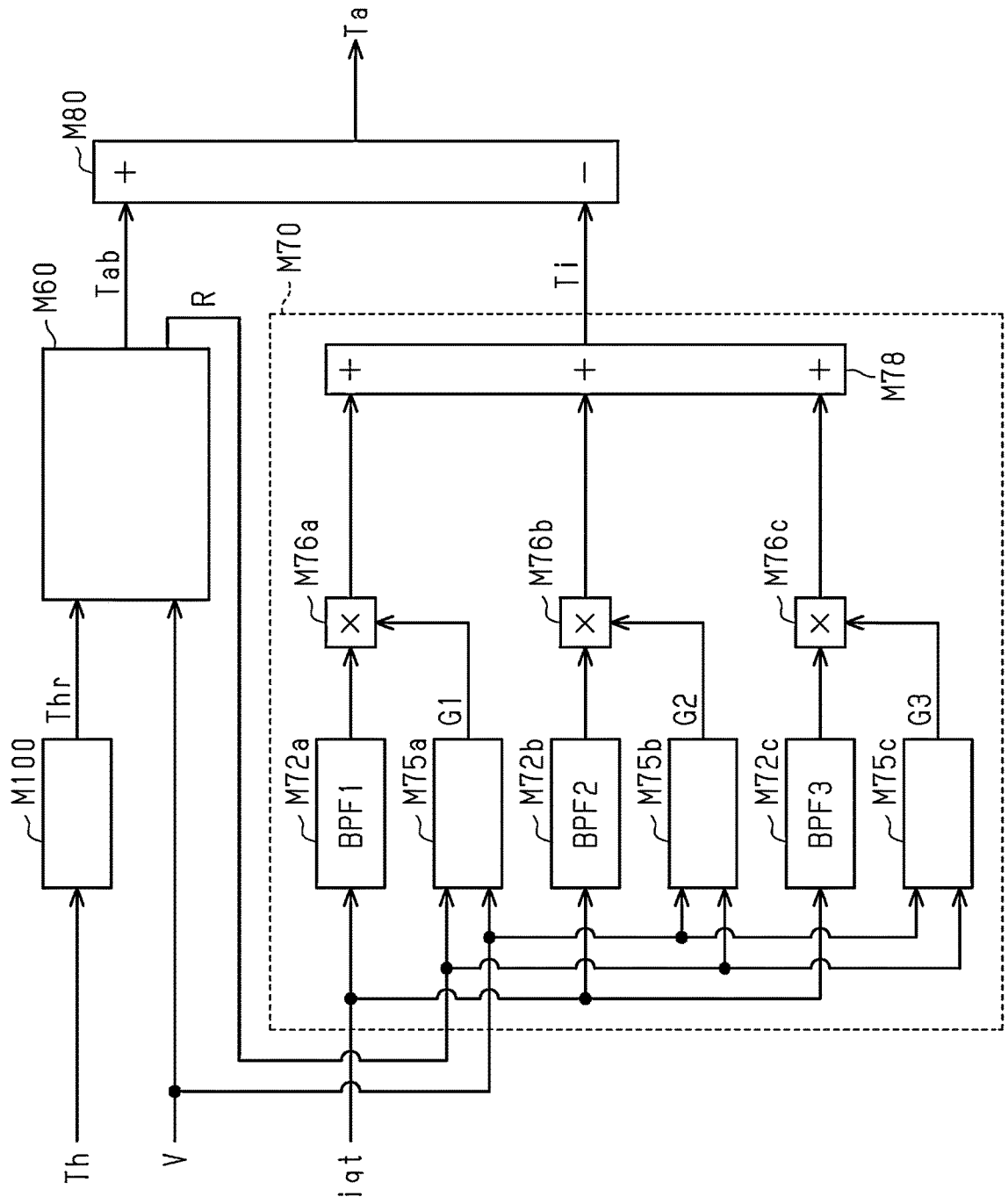
FIG. 7 is a block diagram showing a process that is executed by a control device according to a third embodiment.

FIG. 7 shows details of the assist amount setting process M20. In FIG. 7, for the sake of convenience, processes corresponding to processes shown in FIG. 5 are denoted by identical step numbers.

A filter process M100 shown in FIG. 7 is a process of receiving the steering torque Th and outputting a steering torque Thr. As an example, the filter process M100 may be a process of delaying the phase of the steering torque Th. For example, the filter process M100 may be a process for performing the phase compensation of the steering torque Th in order to adjust the frequency characteristic of the phase difference between both sides of a torsion bar included in the torque sensor 60.

The road information process M70 includes three band-pass filters M72a, M72b, M72c that are different from each other in transmission frequency band. A gain multiplying process M76a is a process of multiplying an output value of the bandpass filter M72a by a gain G1. A gain multiplying process M76b is a process of multiplying an output value of the bandpass filter M72b by a gain G2. A gain multiplying process M76c is a process of multiplying an output value of the bandpass filter M72c by a gain G3. An addition process M78 is a process of substituting a value resulting from adding respective output values of the gain multiplying processes M76a, M76b, M76c, into the road surface information torque Ti.

A gain setting process M75a is a process of calculating the gain G1, using the vehicle velocity V and the assist gradient R as inputs. The gain setting process M75a may be a process in which the PU 52 performs map computation for the gain G1 in a state where map data is stored in the storage device 54. The map data is data in which the vehicle velocity V and the assist gradient R are used as input variables and the gain G1 is used as an output variable.

A gain setting process M75b is a process of calculating the gain G2, using the vehicle velocity V and the assist gradient R as inputs. The gain setting process M75b may be a process in which the PU 52 performs map computation for the gain G2 in a state where map data is stored in the storage device 54. The map data is data in which the vehicle velocity V and the assist gradient R are used as input variables and the gain G2 is used as an output variable.

A gain setting process M75c is a process of calculating the gain G3, using the vehicle velocity V and the assist gradient R as inputs. The gain setting process M75c may be a process in which the PU 52 performs map computation for the gain G3 in a state where map data is stored in the storage device 54. The map data is data in which the vehicle velocity V and the assist gradient R are used as input variables and the gain G3 is used as an output variable.

Operation and Effect of Embodiment

The PU 52 calculates the basic assist amount Tab, using the steering torque Thr and the vehicle velocity V as inputs. The PU 52 sets the target reaction force torque Ts depending on the value resulting from subtracting the shaft force F from the basic assist amount Tab. Then, the torque of the reaction force motor 22 is controlled depending on the target reaction force torque Ts. The assist gradient R, which is the rate of the change in the basic assist amount Tab with respect to the change in the steering torque Thr, is a value that can be adjusted by control design. Therefore, the steering reaction force that is given to the driver can be freely designed by control design. However, the stability of the steering system more easily decreases as the assist gradient R is larger. Therefore, in the case where amplitudes in a predetermined frequency band increase due to the road surface information torque Ti when the stability of the steering system easily decreases, there is a risk that the steering system actually becomes unstable.

Hence, the PU 52 sets the gains G1 to G3 depending on the assist gradient R. Thereby, it is possible to restrain an excessive increase in amplitudes in a frequency band that causes the unstableness. Accordingly, it is possible to restrain the steering system from becoming unstable due to the road surface information torque Ti.

Fourth Embodiment

A fourth embodiment will be described below with a focus on differences from the third embodiment, with reference to the drawings.

Figure 8:
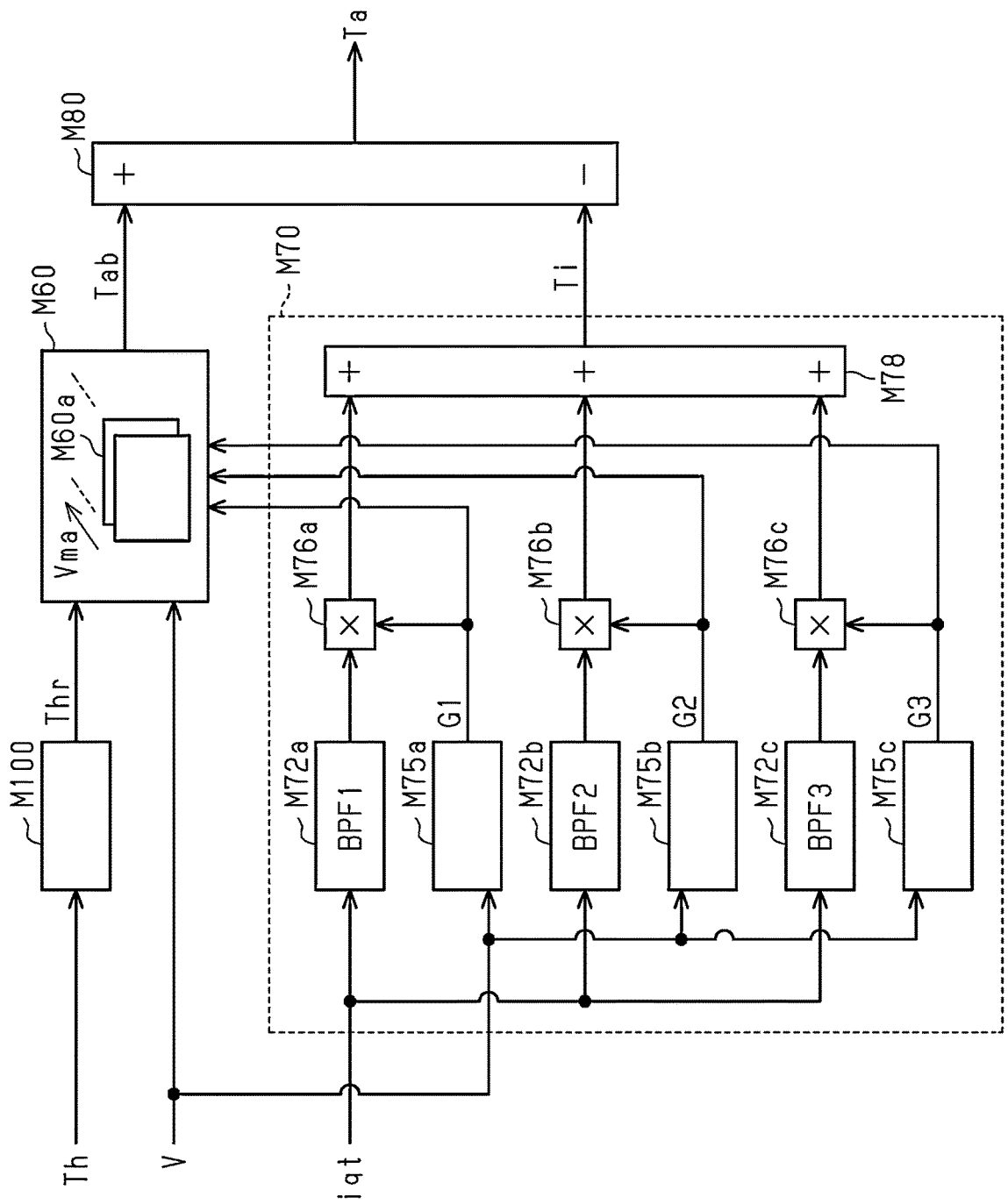
FIG. 8 is a block diagram showing a process that is executed by a control device according to a fourth embodiment.

FIG. 8 shows details of the assist amount setting process M20. In FIG. 8, for the sake of convenience, processes corresponding to processes shown in FIG. 7 are denoted by identical step numbers.

As shown in FIG. 8, in the gain setting processes 75a, 75b, 75c according to the embodiment, the assist gradient R is not used as an input. Instead, in the basic assist amount setting process M60, the basic assist amount Tab is set using the gains G1 to G3 as inputs.

More specifically, the basic assist amount setting process M60 is a process of calculating the basic assist amount Tab by selectively using a plurality of kinds of map data M60a identified by a map identifying variable Vma. The map data M60a is data in which the steering torque Thr is used as an input variable and the basic assist amount Tab is used as an output variable. The plurality of kinds of map data M60a includes pieces of data that are different from each other in the assist gradient R. The map identifying variable Vma is set depending on the vehicle velocity V and the gains G1 to G3.

Operation and Effect of Embodiment

The PU 52 alters the map data M60a that is used in the calculation of the basic assist amount Tab, depending on the gains G1 to G3 of the road information process M70. Thereby, the assist gradient R is altered depending on the gains G1 to G3. Thereby, it is possible to restrain the generation of such an assist gradient R that the steering system becomes unstable due to the road surface information torque Ti.

Correspondence Relation

The correspondence relation between matters in the above embodiments and matters described in "SUMMARY" is as follows.

The reaction force setting process corresponds to the assist amount setting process M20, the shaft force setting process M22, and the subtraction process M24. The reaction force giving process corresponds to the reaction force operation signal generating process M26. The predetermined-component reflecting process corresponds to the road information process M70. The interlocking process corresponds to the input of the shaft force gradient dF to the filter factor setting process M74 in FIG. 4. Further, the interlocking process corresponds to the input of the filter factor ti to the angle shaft force setting process M40 and the electric current shaft force setting process M42 in FIG. 6. The interlocking process corresponds to the input of the assist gradient R to the gain setting processes M75a, M75b, M75c in FIG. 7. The interlocking process corresponds to the input of the gains G1 to G3 to the assist amount setting process M20 in FIG. 8.

The shaft force gradient calculating process corresponds to the shaft force gradient calculating process M90. The interlocking process corresponds to the input of the shaft force gradient dF to the filter factor setting process M74 in FIG. 4. Further, the interlocking process corresponds to the input of the filter factor ti to the angle shaft force setting process M40 and the electric current shaft force setting process M42 in FIG. 6.

The interlocking process corresponds to the process exemplified in FIG. 4. The reflection specifying variable corresponds to the filter factor ti.

The predetermined-component extracting process corresponds to the bandpass filter M72. The extraction altering process corresponds to the filter factor setting process M74. The shaft force specifying variable corresponds to the map identifying variables Vm1, Vm2. The interlocking process corresponds to the process exemplified in FIG. 6.

The basic assist amount setting process corresponds to the assist amount setting process M20.

The interlocking process corresponds to the input of the assist gradient R to the gain setting processes M75a, M75b, M75c in FIG. 7.

The interlocking process corresponds to the input of the gains G1 to G3 to the assist amount setting process M20 in FIG. 8.

Other Embodiments

The embodiments can be carried out while being modified as follows. The embodiments and the following modifications can be carried out while being combined with each other within a range in which there is no technical inconsistency.

Predetermined-Component Extracting Process

The variable that indicates a frequency signal to be given to the turning wheels 34 and that is an extraction object for a predetermined component is not limited to the q-axis electric current iqt. For example, the torque of the turning motor 42 may be adopted.

Extraction Altering Process

As the extraction altering process, the process of altering the filter factor ti from only the vehicle velocity V has been exemplified in FIG. 5, but is not limited to this.

The extraction altering process is not limited to the process of altering the filter factor of the bandpass filter. For example, a process of altering the gain G depending on a variable such as the vehicle velocity V may be adopted.

In FIG. 7, only two gains of the gains G1 to G3 may be altered depending on the assist gradient R. Further, for example, in FIG. 7, only one gain of the gains G1 to G3 may be altered depending on the assist gradient R. Further, for example, in FIG. 7 and FIG. 8, only two gains of the gains G1 to G3 may be altered depending on the vehicle velocity V. Further, for example, in FIG. 7 and FIG. 8, only one gain of the gains G1 to G3 may be altered depending on the vehicle velocity V.

The predetermined-component extracting process is not limited to the process with a bandpass filter corresponding to one frequency band or bandpass filters corresponding to three frequency bands. In the case where there are bandpass filters respectively corresponding to a plurality of arbitrary frequency bands in the predetermined-component extracting process, the extraction altering process may be performed as follows. For example, the extraction altering process may be a process of altering the filter factors of the bandpass filters depending on the vehicle velocity V or the like. Further, for example, the extraction altering process may be a process of altering only the filter factors of some bandpass filters of the bandpass filters respectively corresponding to the plurality of frequency bands, depending on the vehicle velocity V or the like.

Predetermined-Component Reflecting Process

The predetermined-component reflecting process does not need to be the process of calculating the road surface information torque Ti by multiplying the output value of the bandpass filter by the gain. For example, a process of using the output value of the bandpass filter as the road surface information torque Ti may be adopted.

Shaft Force Setting Process

The angle shaft force setting process M40 does not need to be the process of performing map computation for the angle shaft force Fr using the angle shaft force map M40a. For example, the angle shaft force setting process M40 may be a process of substituting a value resulting from multiplying the target turning corresponding angle $\theta p^*$ by a gain, into the angle shaft force Fr. The gain may be capable of varying depending on the vehicle velocity V.

The inputs of the angle shaft force setting process M40 do not need to be the target turning corresponding angle $\theta p^*$ and the vehicle velocity V. For example, the vehicle velocity V may be excluded from the inputs of the angle shaft force setting process M40. Further, for example, the angle variable in the steering system as the input variable of the angle shaft force setting process M40 is not limited to the target turning corresponding angle $\theta p^*$. For example, the angle variable in the steering system may be the turning corresponding angle $\theta p$. Further, for example, the angle variable in the steering system may be the steering angle $\theta s$.

The electric current shaft force setting process M42 is not limited to the process of performing map computation for the electric current shaft force Fi using the electric current shaft force map M42a. For example, the electric current shaft force setting process M42 may be a process of substituting a value resulting from multiplying the q-axis electric current iqt by a gain, into the electric current shaft force Fi.

The input of the electric current shaft force setting process M42 is not limited to the q-axis electric current iqt. For example, as the input of the electric current shaft force setting process M42, the q-axis electric current iqt and the vehicle velocity V may be adopted. Further, for example, as the input of the electric current shaft force setting process M42, angle variables in the steering system, as exemplified by the target turning corresponding angle $\theta p^*$, the turning corresponding angle $\theta p$ and the steering angle $\theta s$, may be included.

The shaft force setting process does not need to include both of the two processes of the angle shaft force setting process M40 and the electric current shaft force setting process M42. For example, only one process of the two processes of the angle shaft force setting process M40 and the electric current shaft force setting process M42 may be included.

Shaft Force Gradient Calculating Process

The shaft force gradient calculating process is not limited to the process of calculating the shaft force gradient dF, using the vehicle velocity V, the target turning corresponding angle $\theta p^*$ and the q-axis electric current iqt as inputs. For example, in the shaft force gradient calculating process, the angle shaft force Fr may be used as an input, instead of the target turning corresponding angle $\theta p^*$. Further, for example, in the shaft force gradient calculating process, the electric current shaft force Fi may be used as an input, instead of the q-axis electric current iqt.

Interlocking Process

In FIG. 4, the filter factor ti is altered using the shaft force gradient dF as an input, but the present disclosure is not limited to this. For example, the gain G may be altered using the shaft force gradient dF as an input. Further, for example, both of the filter factor ti and the gain G may be altered using the shaft force gradient dF as an input.

In FIG. 6, the value of the map identifying variable Vm1 for identifying which of the plurality of kinds of angle shaft force maps M40a is used is set depending on the filter factor ti, but the present disclosure is not limited to this. For example, a guard process of restricting the magnitude of the change amount of the angle shaft force Fr may be provided, and a guard value for the guard process may be altered depending on the filter factor ti.

In FIG. 6, the value of the map identifying variable Vm2 for identifying which of the plurality of kinds of electric current shaft force maps M42a is used is set depending on the filter factor τi, but the present disclosure it not limited to this. For example, a guard process of restricting the magnitude of the change amount of the electric current shaft force Fi may be provided, and a guard value for the guard process may be altered depending on the filter factor τi.

The shaft force specifying variable does not need to be constituted by the variable relevant to the electric current shaft force Fi and the variable relevant to the angle shaft force Fr. For example, a guard process of restricting the magnitude of the change amount of the shaft force F may be provided, and a guard value for the guard process may be altered depending on the filter factor τi. In this case, the shaft force specifying variable is the guard value of the shaft force F.

In the case where the gain G is altered depending on the vehicle velocity V or the like as described in "Extraction Altering Process", the value of the shaft force specifying variable may be altered depending on the gain G.

In FIG. 7, the gains G1 to G3 are altered depending on the assist gradient R, but the present disclosure is not limited to this. For example, the filter factor τi may be altered depending on the assist gradient R.

In FIG. 8, the gains G1 to G3 are input to the basic assist amount setting process M60, but the present disclosure is not limited to this. For example, only two gains of the three gains G1 to G3 may be input to the basic assist amount setting process M60. Further, for example, only one gain of the gains G1 to G3 may be input to the basic assist amount setting process M60.

The reflection specifying variable that is input to the basic assist amount setting process M60 is not limited to the gains G1 to G3. For example, in FIG. 8, a filter factor setting process in which the PU 52 sets the respective filter factors of the bandpass filters M72a, M72b, M72c depending on the vehicle velocity or the like may be executed, and the filter factors may be input to the basic assist amount setting process M60.

The process of altering one of two values of the value of the reflection specifying variable and the variable that determines the change in the steering reaction force with respect to the operation of the steering shaft, depending on the other of the two values is not limited to a process constituted by one of a process A and a process B described below.

Figure 9:
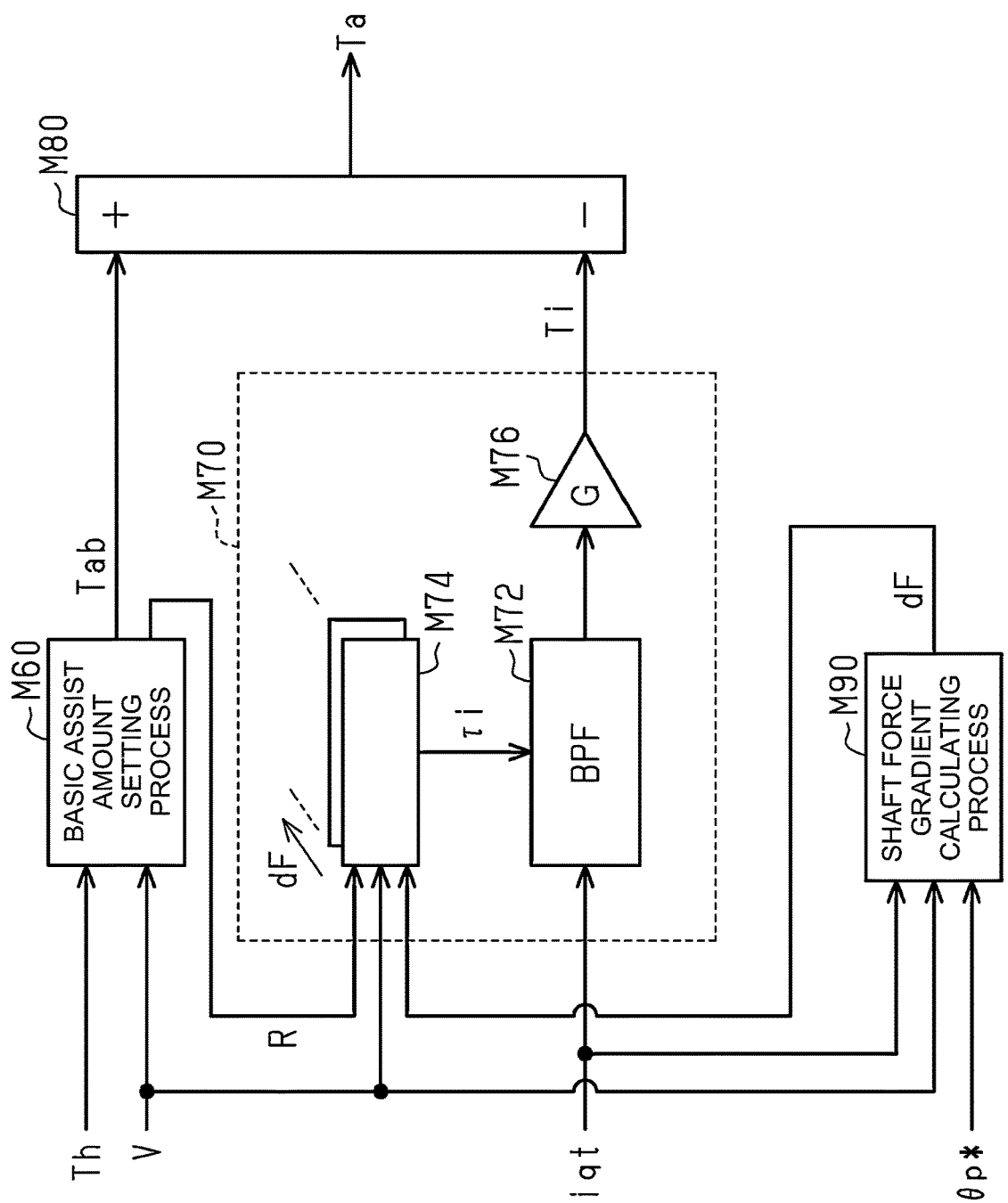
FIG. 9 is a block diagram showing a process that is executed by a control device according to a modification of the fourth embodiment.

Process A: One of two values of the value of the reflection specifying variable and the shaft force gradient is altered depending on the other of the two values Process B: One of two values of the value of the reflection specifying variable and the assist gradient is altered depending on the other of the two values FIG. 9 shows an example in which both of the process A and the process B are included. In FIG. 9, for the sake of convenience, processes corresponding to processes shown in FIG. 4 are denoted by identical reference characters. As shown in FIG. 9, in the filter factor setting process M74, the filter factor τi is set using the vehicle velocity V, the shaft force gradient dF and the assist gradient R as inputs.

Steering Control Device

The steering control device is not limited to a device that executes software processing. For example, a dedicated hardware circuit as exemplified by an ASIC may be included and may execute at least some of the processes that are executed in the above embodiments. That is, the steering control device only needs to include a processing circuit that has one of the following configurations (a) to (c).

(a) A processing circuit including a processor that executes all of the above processes in accordance with programs and a program storing device that stores the program, as exemplified by a storage device (b) A processing circuit including a processor that executes some of the above processes in accordance with programs, a program storing device, and a dedicated hardware circuit that executes the other processes (c) A processing circuit including a dedicated hardware circuit that executes all of the above processes A plurality of software execution devices including processor and program storing devices may be provided. Further, a plurality of dedicated hardware circuits may be provided.

OTHERS

The turning motor 42 does not need to be a synchronous motor. For example, an induction motor may be adopted.

The steering device 10 has a link-less structure in which the steering wheel 12 and the turning wheels 34 are mechanically separated at all times, in the above embodiments, but without being limited to this, may have a structure in which the steering wheel 12 and the turning wheels 34 can be mechanically separated by a clutch.

What is claimed is:

1. A steering control device configured to control a steering system including a reaction force motor and a turning motor, the reaction force motor giving a steering reaction force to a steering shaft, the turning motor turning a turning wheel in a state where dynamic power transmission from the steering shaft is blocked, the steering control device comprising a processor configured to execute a reaction force setting process, a reaction force giving process, and an interlocking process, wherein:

in the reaction force setting process, the processor sets the steering reaction force using a predetermined-component reflecting process;

in the reaction force giving process, the processor operates the reaction force motor such that the reaction force motor gives the steering reaction force set by the reaction force setting process;

in the predetermined-component reflecting process, the processor reflects, in the steering reaction force, a predetermined component of a frequency signal that is given to the turning wheel;

in the interlocking process, the processor alters one of a first pair of variables consisting of a reflection specifying variable and a variable that determines a change in the steering reaction force with respect to an operation of the steering shaft, depending on another of the first pair; and the reflection specifying variable specifies a way to extract the predetermined component.

2. The steering control device according to claim 1, wherein:

the processor is configured to execute a shaft force gradient calculating process;

in the shaft force gradient calculating process, the processor calculates a shaft force gradient;

the shaft force gradient is a rate of a change in a force against a rotation of the steering shaft with respect to a change in a rotation angle of the steering shaft; and in the interlocking process, the processor further alters one of a second pair of variables consisting of the reflection specifying variable and the shaft force gradient, depending on another of the second pair.

3. The steering control device according to claim 2, wherein:

the reaction force setting process includes an assist amount setting process and a shaft force setting process;

in the shaft force setting process, the processor sets a shaft force against a rotation operation of the steering shaft by a driver;

in the assist amount setting process, the processor sets an assist amount by which the driver is assisted to rotate the steering shaft; and the steering reaction force is determined depending on a value resulting from subtracting the assist amount from the shaft force.

4. The steering control device according to claim 3, wherein in the shaft force gradient calculating process, the processor calculates a change amount of the shaft force set by the shaft force setting process with respect to the change in the rotation angle of the steering shaft.

5. The steering control device according to claim 2, wherein in the interlocking process, the processor alters the reflection specifying variable, using the shaft force gradient as an input.

6. The steering control device according to claim 3, wherein:
the predetermined-component reflecting process includes a predetermined-component extracting process and an extraction altering process;
in the predetermined-component extracting process, the processor extracts the predetermined component depending on the reflection specifying variable;
in the extraction altering process, the processor alters the reflection specifying variable;
in the shaft force setting process, the processor sets the shaft force depending on a shaft force specifying variable that specifies a relation of the shaft force with respect to the change in the rotation angle of the steering shaft; and
in the interlocking process, the processor alters the shaft force specifying variable, using the reflection specifying variable as an input.

7. The steering control device according to claim 1, wherein:
the reaction force setting process includes a basic assist amount setting process and a shaft force setting process:
in the shaft force setting process, the processor sets a shaft force against a rotation operation of the steering shaft by a driver;
in the basic assist amount setting process, the processor sets a basic assist amount by which the driver is assisted to rotate the steering shaft, using a steering torque as an input;
the steering reaction force is determined depending on a value resulting from subtracting the basic assist amount from the shaft force;
in the interlocking process, the processor further alters one of a second pair of variables consisting of the reflection specifying variable and an assist gradient, depending on another of the second pair; and
the assist gradient is a rate of a change amount of the basic assist amount with respect to a change amount of the steering torque.

8. The steering control device according to claim 7, wherein in the interlocking process, the processor alters the reflection specifying variable, using the assist gradient as an input.

9. The steering control device according to claim 7, wherein:
the predetermined-component reflecting process includes a predetermined-component extracting process and an extraction altering process;
in the predetermined-component extracting process, the processor extracts the predetermined component depending on the reflection specifying variable;
in the extraction altering process, the processor alters the reflection specifying variable; and
in the interlocking process, the processor alters the assist gradient, using the reflection specifying variable as an input.

* * * * *